United States Patent Office 3,544,626
Patented Dec. 1, 1970

3,544,626
QUATERNARY AMMONIUM AND PHOSPHONIUM SALTS AS CATALYSTS IN THE PRODUCTION OF CARBOXYLIC ACID CHLORIDES
John Eric Carr, Albert Edward Kaye, and James Harry Wild, Manchester, England, assignors to Imperial Chemical Industries Limited, London, England, a corporation of Great Britain
No Drawing. Filed Sept. 25, 1967, Ser. No. 670,385
Claims priority, application Great Britain, Sept. 29, 1966, 4,326/66
Int. Cl. C07c 51/58
U.S. Cl. 260—544        4 Claims

ABSTRACT OF THE DISCLOSURE

A process for the manufacture of a carboxylic acid chloride which comprises reacting a carboxylic acid with phosgene in the presence of a quaternary ammonium, quaternary phosphonium, or ternary sulphonium salt.

---

This invention relates to a chemical process and more particularly to a process for the manufacture of carboxylic acid chlorides.

It is already known that carboxylic acid chlorides may be prepared by reacting carboxylic acids with phosgene. In order that the reaction may proceed smoothly to give a high yield of acid chloride it is advantageous to employ a catalyst. It has now been found that the reaction is catalysed by quaternary ammonium, quaternary phosphonium and ternary sulphonium salts.

Accordingly, the present invention provides a process for the manufacture of a carboxylic acid chloride which comprises reacting a carboxylic aid with phosgene in the presence of a quaternary ammonium, quaternary phosphonium or ternary sulphonium salt.

Suitable quaternary ammonium and phosphonium salts are compounds of the formula:

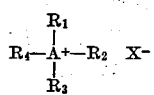

wherein A represents a nitrogen or phosphorus atom, $X^-$ represents an anion and $R_1$, $R_2$, $R_3$ and $R_4$ represent unsubstituted or substituted hydrocarbon radicals and wherein at least two of the radicals represented by $R_1$, $R_2$ and $R_3$ may optionally be joined or fused together to form with A a heterocyclic ring or rings.

When $R_1$, $R_2$, $R_3$ and $R_4$ represent four distinct radicals they may be the same or different but it is preferred that at least three of the said radicals are alkyl radicals and, more preferably, lower alkyl radicals having not more than four carbon atoms in each radical. When $R_1$, $R_2$ and $R_3$ represent alkyl radicals, $R_4$ may represent an unsubstituted or sustituted alkyl, cycloalkyl or aralkyl radical. As examples of quaternary ammonium and phosphonium salts in these categories there may be mentioned tetramethylammonium, tetraethylammonium, dodecyltrimethylammonium, cetyltrimethylammonium, cyclohexyltrimethylammonium, benzyltrimethylammonium, carboxymethyltrimethylammonium, tetraethylphosphonium and tributylmethylphosphonium salts.

As examples of heterocyclic rings formed by joining together two of the radicals represented by $R_1$, $R_2$ and $R_3$ and the atom represented by A there may be mentioned pyrrolidine, pyrroline, piperidine, morpholine, piperazine and pyrrole rings. As examples of heterocyclic rings formed by joining or fusing together three of the radicals represented by $R_1$, $R_2$ and $R_3$ and the atom represented by A there may be mentioned quinuclidine, 1,4-diazabicyclo(2.2.2)octane, pyridine and quinoline. Quaternary salts of these types which may be used in the process of the present invention include methylpyridinium, cetylpyridinium, cyclohexylpyridinium, benzylpyridinium, pyridylpyridinium, methylquinolinium, dimethyl-4,4'-bipyridinium and N,N'-ethylene-1,2'-bipyridilium salts.

Suitable ternary sulphonium salts are compounds of the formula:

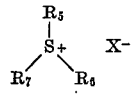

where $X^-$ represents an anion and $R_5$, $R_6$ and $R_7$ represent unsubstituted or substituted hydrocarbon radicals, preferably unsubstituted or substituted alkyl radicals.

The anion $X^-$ of the quaternary salts or ternary sulphonium salts may be an anion derived from an inorganic or an organic acid. Thus, as examples of suitbale quaternary salts there may be mentioned chlorides, bromides, iodides, methosulphates, ethosulphates, acetates, acrylates, methacrylates, and benzoates. If desired, the anion of the quaternary salt may be derived from the same acid as is being reacted with the phosgene.

Any carboxylic acid may be reacted with phosgene by the process of the present invention. Thus, aliphatic, cycloaliphatic, arylaliphatic or aromatic mono- or polycarboxylic acids may be used. Examples of carboxylic acids which may be used include acetic, propionic, butyric 2-ethylhexanoic, dodecanoic, acrylic, methacrylic, crotonic, oleic, chloroacetic, oxalic, succinic, adipic, sebacic, benzoic, phenylacetic, cinnamic and terephthalic acids.

The process of the present invention has been found to be particularly suitable for the preparation of acid chlorides from $\alpha$-$\beta$ unsaturated carboxylic acids such as acrylic acid, the derived acryloyl chloride being an important intermediate particularly useful in the preparation of dyestuffs having acrylamido groups. In the reaction of acrylic acid with phosgene some addition of hydrogen chloride takes place at the double bond and the reaction product is usually a mixture of acryloyl chloride and $\beta$-chloropropionyl chloride. When an $\alpha$-$\beta$ unsaturated carboxylic acid is used, it is advantageous to employ a copper salt, for example cuprous chloride or cupric acetate, to inhibit polymerisation.

The process of the present invention may be carried out either continuously or discontinuously. One suitable method is to pass phogene into a mixture of the carboxylic acid and the catalyst. The catalysts i.e. quaternary ammonium, quaternary phosphonium or ternary sulphonium salts vary somewhat in their activity from compound to compound but it is usually found that a suitable amount to use is from 0.5% to 10% by weight based on the weight of carboxylic acid. The phosgene is preferably employed in a slight excess, for example 2–20%, over that stoichiometrically required for reaction with the carboxylic acid. If desired, an inert solvent may be employed for the reaction, for example a hydrocarbon or chlorohydrocarbon. The reaction is exothermic and the temperature can largely be controlled by adjusting the rate of addition of the phosgene. Reaction temperatures in the range of from 70° C. to 100° C. are usually employed in the case of $\alpha$-$\beta$ unsaturated acids but higher temperatures may be employed in other cases.

The carboxylic acid chloride may be isolated from the reaction mixture in conventional manner. Thus, after removing the dissolved hydrogen chloride the carboxylic acid chloride may be obtained by distillation.

The invention is illustrated but not limited by the following examples in which all parts are by weight:

EXAMPLE 1

Into a mixture of 432 parts acrylic acid, 1 part cupric acetate and 12 parts tetraethylammonium chloride, 680 parts phosgene are added during 14 hours controlling the temperature of the reaction at 80–90° C. by means of reflux condensation. On completion, the temperature is raised to 125–130° C. and acryloyl chloride collected via a short bead-packed column. A yield of 346 parts acryloyl chloride containing 3% β-chloropropionyl chloride is obtained.

Omission of the tetraethylammonium chloride in the experiment does not permit maintenance of reaction temperature and interaction is not observed.

EXAMPLE 2

Into 432 parts acrylic acid, 1 part cupric acetate and 12 parts tributylmethylphosphonium iodide at 85° C., 720 parts phosgene are passed maintaining the temperature between 78 and 85° C. by means of reflux condensation. The mixture, distilled under atmospheric conditions via a short bead-packed column, produces 355 parts acryloyl chloride containing 3% β-chloropropionyl chloride. Omission of the tributylmethylphosphonium iodide does not permit maintenance of reaction temperature and inter-action is not observed.

EXAMPLE 3

Into 116 parts n-caproic acid and 2 parts tetraethylammonium chloride, 105 parts phosgene are passed at 86–108° C. and the mixture distilled under reduced pressure to give 95 parts n-caproyl chloride. Omission of the tetraethylammonium chloride does not permit maintenance of reaction temperature and inter-action is not observed.

EXAMPLE 4

Into 270 parts stearic acid and 1.5 parts tetraethylammonium chloride, 130 parts phosgene are passed maintaining the temperature between 88° and 106° C. The mixture distilled under reduced pressure produces 268 parts stearoyl chloride.

Omission of the tetraethylammonium chloride does not permit maintenance of reaction and interaction is not observed.

EXAMPLE 5

Into 122 parts benzoic acid and 2 parts tetramethylammonium chloride, 130 parts phosgene are passed maintaining the temperature between 95° and 118° C. The mixture distilled under reduced pressure via a short bead-packed column produces 129 parts benzoyl chloride.

Omission of the tetramethylammonium chloride does not permit maintenance of reaction temperature and interaction is not observed.

EXAMPLE 6

Into 36 parts acrylic acid, .1 part cuprous chloride and 1 part trimethylcyclohexylammonium iodide at 85° C., 60 parts of phosgene are passed over 10 hours. The mixture gives 56.5 parts of crude product, equivalent to 38.5 parts acryloyl chloride.

EXAMPLE 7

Into 36 parts acrylic acid, .1 part cuprous chloride and 3.5 parts methylquinolinium iodide are passed 67 parts of phosgene over 7 hours, the temperature being maintained at 85°–97° C. The mixture gives 60 parts of crude product, equivalent to 37.4 parts acryloyl chloride.

We claim:

1. A process for the manufacture of an aliphatic or aromatic carboxylic acid chloride which comprises reacting an aliphatic or aromatic mono- or dicarboxylic acid having up to 18 carbon atoms with phosgene in the presence of 0.5% to 10% by weight, based on the weight of acid, of a compound of the formula:

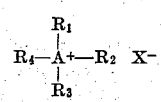

wherein A represents a nitrogen or phosphorus atom, $R_1$, $R_2$ and $R_3$ represent lower alkyl radicals, $R_4$ represents a lower alkyl radical or cyclohexyl and $X^-$ represents an anion derived from an inorganic or organic acid.

2. A process as claimed in claim 1 wherein the acid is an α-β ethylenically unsaturated acid.

3. A process a claimed in claim 2 wherein the acid is acrylic acid.

4. The process of claim 1 wherein $X^-$ is a chloride, bromide, iodide, methosulphate, ethosulphate or is derived from a mono- or dicarboxylic acid having up to 18 carbon atoms.

References Cited

UNITED STATES PATENTS 2,848,491   8/1958   Mackenzie _____ 260—544

LORRAINE A. WEINBERGER, Primary Examiner

E. J. GLEIMAN, Assistant Examiner